Patented Mar. 24, 1936

2,035,315

UNITED STATES PATENT OFFICE 2,035,315

STORAGE BATTERY ELECTRODE

Harold R. Harner and Melvin F. Chubb, Joplin, Mo., assignors to The Eagle-Picher Lead Company, Cincinnati, Ohio, a corporation of Ohio No Drawing. Application January 25, 1935, Serial No. 3,470

9 Claims. (Cl. 136—26)

Our invention relates to the manufacture of storage battery electrodes and has for its object to provide an electrode and a method of manufacturing the same, which electrode as compared with electrodes previously manufactured, will have its active material of greatly increased tenacity, enabling it to resist the destructive strains to which it is subject in the forming and use of the electrodes. In the construction of storage battery plates or electrodes as heretofore made, it has been a practice to dip unformed electrodes in dilute sulphuric acid preparatory to drying, to prevent cracked, weak electrodes. This is an undesirable operation, not only from the view-point of procedure, but also because it tends to produce electrodes of non-uniform structure, having a shell of highly sulphated material on the exterior with the interior of the electrode soft and weak. If the dipping operation is omitted, the result is usually weak, cracked electrodes that yield high breakage losses in handling and low quality batteries. This difficulty has been especially severe in the case of present-day negative electrodes. We have discovered, however, that greatly improved results in the tenacity of the active material of the electrodes, and in its efficiency, can be secured by compounding the paste previous to its application to the grid of the electrode with lead oxides and sodium boro-phosphate, using acid or water and acid as a medium. By our invention we eliminate the need for the initial acid dipping of the plates and at the same time produce strong plates free from cracking, without sacrificing any desirable plate qualities.

To carry out our invention we add a small amount of sodium boro-phosphate to the lead materials used in making the paste at some point prior to the introduction of the paste into the grids. The sodium-boro-phosphate may be added as a water solution to a small amount of lead oxide and the resulting lead oxide mass dried, pulverized and added to the other lead materials used in the paste mass. Again, the sodium boro-phosphate may be added directly to the lead materials in the mixer, either in the form of a powdered material or as the water solution. We have successfully used from 0.05% to 1.0%, the amount used being dependent upon the character of the lead materials and upon the drying procedure followed.

As examples of pastes which we have found to give excellent results in practice we would instance the following for positive plates:

*Example 1*

| | Parts by weight |
|---|---|
| Litharge | 65 |
| Red lead | 35 |
| Water containing 0.05 part of sodium boro-phosphate | 10 |
| 1.250 sp. g. sulfuric acid | 8 |

We would also instance the following for negative plates:

*Example 1*

| | Parts by weight |
|---|---|
| Litharge | 100 |
| Blanc fixé | 1.0 |
| Lampblack | 0.2 |
| Water containing 0.05 part sodium boro-phosphate by wt. | 8 |
| 1.250 sp. g. sulfuric acid | 10 |

*Example 2*

| | Parts by weight |
|---|---|
| Litharge | 100 |
| Cellulose or other organic agent | 0.5 |
| Blanc fixé | 0.5 |
| Lamp black | 0.2 |
| Water containing 0.10 part sodium boro-phosphate | 8 |
| 1.250 sp. g. sulfuric acid | 10 |

The prepared active material is pasted in the plates in conventional manner and dried in an oven under controlled humidity conditions bonding to an electrode of excellent physical strength. We have achieved excellent results with our electrode when dried at a speed of thirty minutes or more total treating and drying time. In those cases where the total treating and drying time was less than thirty minutes the results achieved were not as satisfactory as in those cases of thirty minutes or more. Plates made according to our process are entirely sound and of uniform structure throughout, a result very much to be desired.

The base materials from which we prepare our paste which have given the best results are chosen from the group consisting of litharge, red lead, lead sub-oxide, lead powder and mixtures thereof, and in this application we have specifically claimed the compounding of the paste and the manufacture of the electrodes.

In our co-pending application Serial No. 3,645, we have described and claimed the manufacture of a storage battery electrode containing as an ingredient of the paste a fumed basic lead sulphate, as described in the patent to Calbeck, et al. No. 1,668,801, dated May 28, 1928, together with sodium boro-phosphate.

Having thus described our invention, what we claim as new and desire to secure by Letters Patent is:

1. A paste for lead-acid storage battery electrodes characterized by the presence of sodium boro-phosphate in the active material thereof.

2. A paste for lead-acid storage battery electrodes comprising as ingredients one or more oxides of lead and sodium boro-phosphate.

3. A paste for lead-acid storage battery electrodes comprising as ingredients lead oxide, lead powder and sodium boro-phosphate.

4. A paste for lead-acid storage battery electrodes comprising as ingredients lead oxide, lead powder, lead suboxide and sodium boro-phosphate.

5. A paste for lead-acid storage battery electrodes comprising as ingredients lead suboxide and sodium boro-phosphate.

6. A paste for lead-acid storage battery electrodes comprising as active ingredients one or more oxides of lead selected from the group consisting of litharge, red lead, lead suboxide, and 0.025% to 1.00% sodium boro-phosphate.

7. A lead-acid storage battery electrode comprising as active ingredients one or more oxides of lead to which has been added sodium boro-phosphate.

8. A lead-acid storage battery electrode comprising as active ingredients lead powder to which has been added sodium boro-phosphate.

9. A lead-acid storage battery electrode characterized by the presence of sodium boro-phosphate as one of the active ingredients.

HAROLD R. HARNER.
M. F. CHUBB.